United States Patent [19]
Kirby

[11] Patent Number: 5,215,500
[45] Date of Patent: Jun. 1, 1993

[54] MATERIAL SPREADING APPARATUS

[76] Inventor: Donald R. Kirby, Rouleau, Saskatchewan, Canada, S0G 4H0

[21] Appl. No.: 873,299

[22] Filed: Apr. 23, 1992

[30] Foreign Application Priority Data

Apr. 22, 1992 [CA] Canada .................................. 2066860

[51] Int. Cl.$^5$ ....................... A01C 17/00; A01F 12/30
[52] U.S. Cl. .................... 460/111; 239/667; 239/682
[58] Field of Search ................. 460/111, 112; 56/13.3, 56/13.4; 239/658, 667, 673, 681, 682, 689

[56] References Cited

U.S. PATENT DOCUMENTS 4,617,942 10/1986 Garner ................................ 460/112
5,082,186 1/1992 Bruns ............................ 239/687 X

FOREIGN PATENT DOCUMENTS 1179567 12/1984 Canada .

Primary Examiner—David J. Bagnell

[57] ABSTRACT

An apparatus for attachment to the rear of a harvester-thresher to evenly distribute the by-product of threshing evenly over a wide area. The by-product is mainly straw and chaff. The apparatus is a single integrally combined unit formed of a straw spreader and a chaff spreader and driven by a single variable speed hydraulic motor. The by-product has a first portion engaged by the flexible and easily releasable flails of the straw spreader as it leaves the rear of the harvester-thresher, the remaining portion gravitates or is directed to the high volume air flow chaff spreader to complete the controllable distribution of the by-product. To increase the efficiency of the unit a shroud with deflectors has been placed around the chaff spreader.

22 Claims, 2 Drawing Sheets

MATERIAL SPREADING APPARATUS

This application relates to material spreading apparatus and, in particular, to a dual spreading apparatus used to evenly and variably distribute the material leaving the rear of a harvester-thresher which is normally in the form of straw and chaff.

BACKGROUND OF THE INVENTION

With the advent of the mobile harvester-thresher a problem arose as to what should be done with the by-product material of threshing leaving the rear outlet thereof. In some cases it was desirable to leave the material in a windrow so that it could be gathered for storage by raking or by compressing and tying it in bales. In other cases it was considered desirable to spread the straw portion evenly so that it could more easily be returned to the soil by cultivation. With the trend to little or zero cultivation taking place it became increasingly necessary to more evenly distribute the straw and the chaff up to 40 feet.

Various devices have been devised to scatter the straw and chaff to avoid the inevitable buildup along a narrow path, two such devices are disclosed in Canadian patent 1,179,567 and in U.S. Pat. No. 4,617,942. The patent "567" teaches a harvester-thresher with a chaff spreading apparatus comprising two fans surrounded by a shroud and placed in the vicinity of the grain shoe for receiving chaff therefrom and a separate straw chopper and straw spreader underneath the rear of the harvester-thresher where the straw is ejected from the straw walkers. Applicants device is considerably different in that it does not require two chaff spreading fans with a double shroud located remotely from the straw spreader but is a single integral unit comprising a straw spreader and chaff fan driven by a single motor all in one location. The United States patent "942" teaches dual straw spreaders, dual choppers and spreaders and dual hydraulic drive motors. Applicants device teaches a single straw spreader and chaff distributing fan driven as an integral unit by a single variable speed hydraulic motor. The amount of straw reaching the chaff spreader can also be controlled by removing or adding the readily removable flails.

SUMMARY OF THE INVENTION

The present invention provides a novel apparatus for attachment to a harvester-thresher to widely and evenly distribute or spread the threshing by-product of straw and chaff over a desired area according to the invention. The material upon exiting from the rear of the harvester-thresher is firstly engaged by rotary flexible flails releasably held in position at the top of a vertical post. The remainder of the material gravitates to a lower position where it is engaged and spread by a high volume air flow created by rotating arms with flexible fan blades mounted at the ends of the arms. To assist in the outward flow of material reaching the lower portion there is provided a shroud with a floor and two vertical walls forming two outlet chutes. The vertical walls can also have a horizontal deflector to assist in the distribution of the material. The vertical post carrying the flexible flails and the arms carrying the flexible blades are driven as an integral unit by a variable hydraulic motor mounted on an inverted channel below the underside of the shroud floor.

In view of the above summary it is readily descernible that a primary object of the present invention is to provide an effective yet simple dual function material spreader that is economical and easy to manufacture.

A further object of the present invention is to provide readily removable flexible flails which can vary the spreading achievable by varying the number or length of the flails.

It is a further object of the present invention to provide a high volume air fan to eject the material evenly to a desired distance sufficiently close to the ground to be unaffected by cross winds.

It is yet another object of the present invention to provide the flails and fan with a single variable drive.

It is still a further object of the present invention to provide a straw spreader and a chaff spreader as an integral unit.

It is yet a further object of the present invention to provide a material spreader enhanced by a shroud with deflectors on the shroud walls.

These and other objects of the present invention will become readily apparent as the following description is read in conjunction with the accompanying drawings wherein like reference numerals indicate like elements throughout the several views.

DETAILED DESCRIPTION OF THE INVENTION

Figure 1:
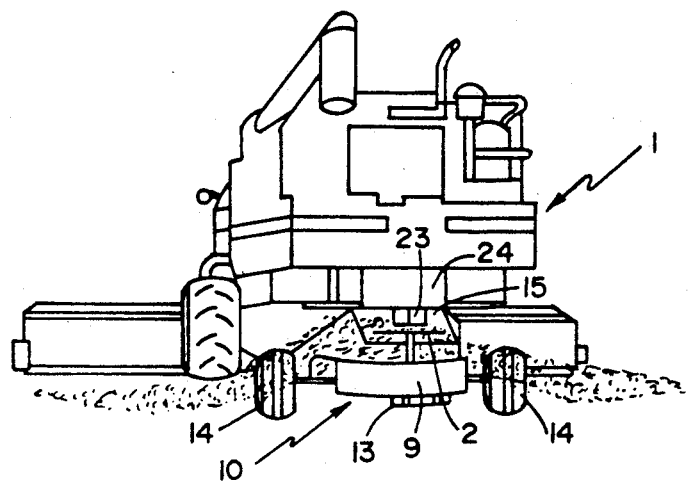
FIG. 1 is a perspective view of the rear of the harvester-thresher with the material spreader operational.

Referring initially to FIG. 1 there is shown the rear section of a conventional harvester-thresher 1. Mounted to this harvester-thresher is applicants invention, in the form of a material spreader designated generally as 10, by means of support frame 13. The material being spread is a by-product of the threshing process whereby kernels of grain or any other like product are removed from the plant stalk. The by-product or material to be spread exits from the tail end of the harvester-thresher by way of the material exit hood 24 and adjustable tail chute 15. Two side by side guide flaps 23 are adjustably mounted on the exit hood 24 to guide the flow of material to an optimum location on the material spreader 10. A flail 2 has been shown to indicate how the first portion of material (mainly straw) is engaged and spread with the remainder or second portion (mainly chaff) gravitating to the fan and shroud, also for engagement and spreading. A shroud vertical rear wall 9 has been shown to indicate its location relative to the remainder of the harvester-thresher 1. Two rear steering and load wheels 14 have also been shown.

Figure 2:
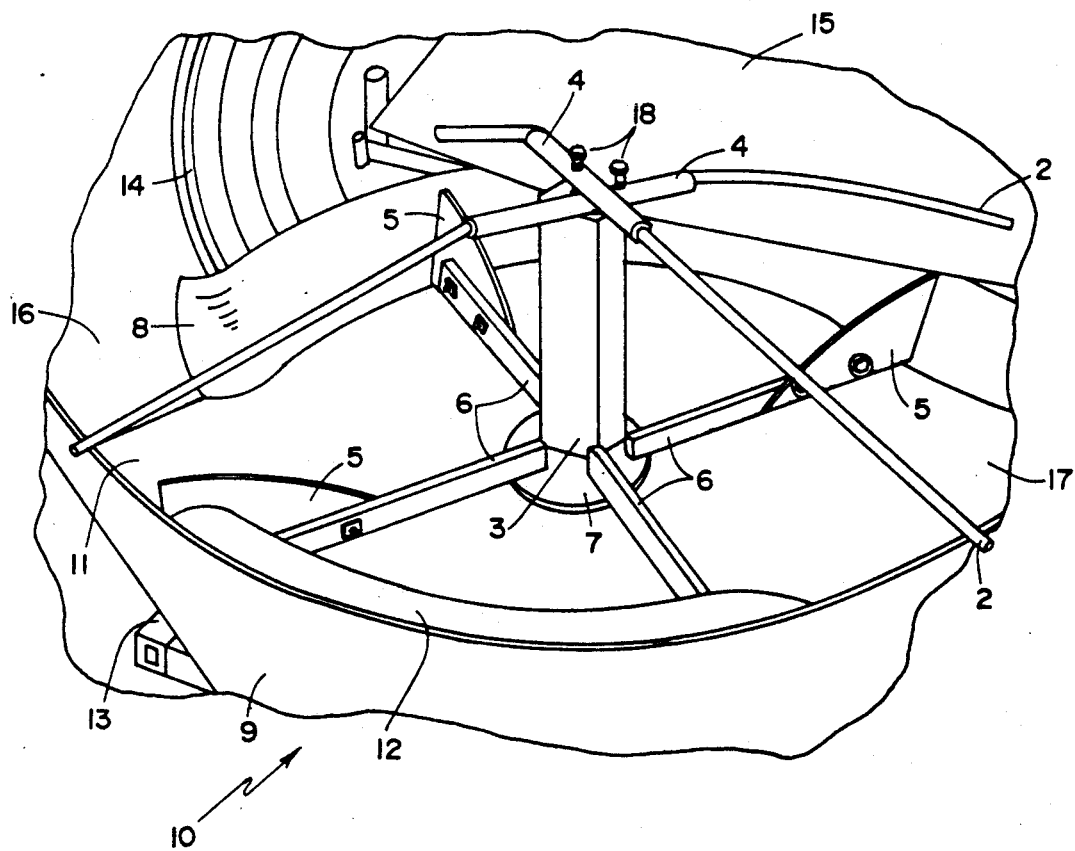
FIG. 2 is a partial perspective view of the material spreader as attached to the rear of the harvester thresher.

Referring now to FIG. 2 we have a more detailed view of the material spreader 10 with a flail type straw spreader and fan type chaff spreader joined as an integral unit. It is to be noted that "straw spreader" and "chaff spreader" are general terms used for description and should not be considered absolutely restrictive since in the straw there is undoubtedly varying degrees of chaff present and in the chaff there is undoubtedly varying degrees of straw present. In fact when desirable one or more flails 2 can be removed to vary the degree of straw reaching the chaff spreader which has a direct relationship as to the width of the spread. The width of spread also being directly related to the R.P.M. of the drive.

In more detail we have a support frame 13 supporting the material spreader 10 on the harvester-thresher 1. To the support frame 13 is connected a motor support in the form of an inverted channel cross member 21 with the variable hydraulic motor 20 (shown in FIG. 3) mounted in the channel part of the cross member. A shroud is mounted on the support frame 13. The shroud includes a shroud floor 11 having attached thereto a front vertical wall 8 and a rear vertical wall 9 which cooperate to form a first shroud chute 16 and a second shroud chute 17 to direct the outflow of material from what is commonly called the chaff spreader. A shroud deflector 12 has been added to the inner surface of the rear vertical wall 9 to enhance the outflow of material. Only one deflector 12 has been shown however a second one can be added to the inner surface of the front vertical wall 8 if desired. A high volume air flow to spread material is created by arms 6 attached to a circular mounting plate 7 at their proximal ends and carrying basically triangular shaped removeable flexible fan blades 5 at their distal ends. The arms 6 may be inclined slightly upwardly towards their distal ends to avoid undue accumulation of material beneath the arms. The mounting plate 7 is connected to motor shaft 22 by a key or other means and is supported and driven by the variable hydraulic motor 20. A variable electric motor or other means such as a belt or chain drive are also envisaged. A post 3 is vertically attached at its proximal end to the circular mounting plate 7 and driven thereby. The post 3 may have various cross sectional shapes such as round, square or triangular. At the top or distal end of post 3 are mounted tubular flail supports with set screws 18 to releasably mount the flexible flails 2. The flails and flail holders need not be circular in shape but can have various cross sections such as square and the flails can be of various lengths. The removal of a flail 2 permits more mass of the material to be spread to reach the second level or chaff spreader thereby increasing the width of the spread. The reverse is also true.

Figure 3:
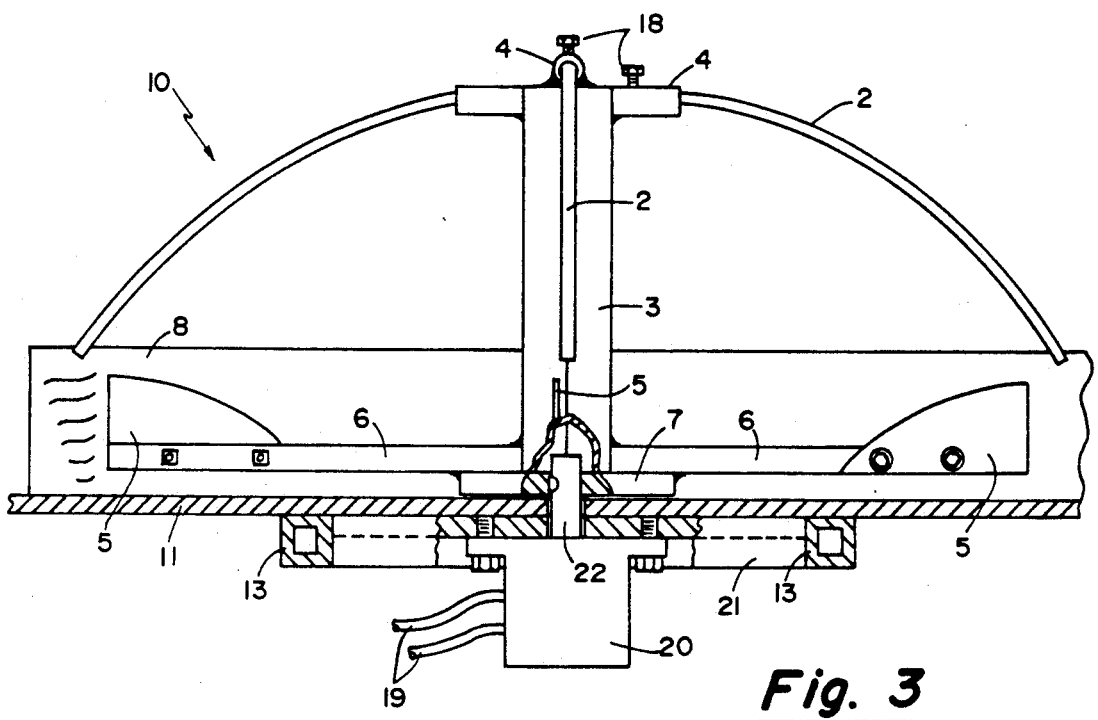
FIG. 3 is a partial elevation view of the flail and fan integral unit with drive motor and partial shroud.

Turning now to FIG. 3 there is illustrated a partial cross section of a front elevation of the material spreader. The support frame 13 to mount the spreader to the harvester-thresher is again shown. This support frame 13 is not to be limited to a square tubular frame but may have to be adapted to fit various models of harvester-threshers. Between the two members of support frame 13 is mounted an inverted channel shaped cross member 21 with a variable speed hydraulic motor 20 mounted within the channel and receiving its motive power through hydraulic lines 19 which are fed by a separate pump or from other sources on the harvester-thresher such as the reel drive. From the variable hydraulic motor 20 extending vertically upwardly through an aperture in channel cross member 21 is a motor drive shaft 22. Mounted on support frame 13 is the shroud floor 11 which also has an aperture to allow passage of motor drive shaft 22. A partial view of the front vertical wall B of the shroud is shown mounted on the shroud floor 11. The portion of the front vertical wall 8 shown is indicated by A—A in FIG. 4. Attached by a key or other means to motor drive shaft 22 is mounting plate 7 which has connected thereto at their proximal ends arms 6. At their distal ends arms 6 have mounted thereon flexible fan blades 5. Also connected at its proximal end to the mounting plate 7 is a vertical post 3. At the distal end of vertical post 3 are flail supports 4 releasably retaining flails 2 by means of set screws 18.

Figure 4:
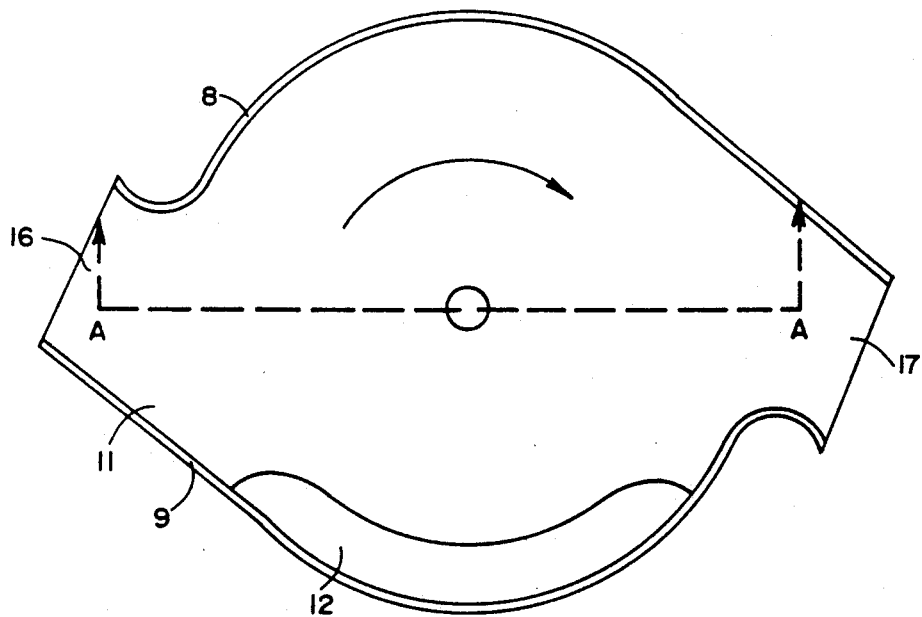
FIG. 4 is a reduced size plan view of the shroud with deflector with cutting plane A—A indicating the portion of the shroud shown in FIG. 3.

Referring now to FIG. 4 we have a slightly downsized version of the shroud which has a shroud floor 11 a front vertical wall 8 and a rear vertical wall 9 forming a first shroud chute 16 and a second shroud chute 17. A shroud deflector 12 is horizontally mounted on the inner surface of rear vertical wall 9. A similar shroud deflector may also be added to the inner surface of the front vertical wall 8 to aid in the efficient outflow of the material being distributed.

Various modifications such as size, shape and arrangement of components may be made without departing from the spirit and scope of the invention. The above disclosure shall be interpreted as illustrative only and limited only by the scope of the invention as defined in the following claims.

What I claim is:

1. The combination with a harvester-thresher, provided with a thresher body having a material exit for straw and chaff, of a material spreading apparatus comprising in combination, support means including a framework adapted to be attached to said thresher body of said harvester-thresher, a shroud means including a horizontal floor means attached to said framework, a first vertical curved wall adjacent said thresher body and a second curved vertical wall remote from said thresher body, said first and second curved vertical walls being attached to said horizontal floor means to form therewith two chute means, drive means including a variable speed hydraulic motor having a drive shaft, a cross member adjacent said horizontal floor means, said drive means being mounted to said cross member such that said drive shaft penetrates vertically through said cross member and said horizontal floor means, a chaff spreading means including arm supporting means fastened to said drive shaft above said horizontal floor means, arms having a proximal and a distal end with said proximal ends fastened to said arm supporting means and said distal ends having mounted thereon flexible fan blades creating a high volume air flow to propel material through said two chute means upon operation of said drive means, a straw spreading means including a vertical post having a proximal end and a distal end said proximal end mounted o said arm supporting means to rotate therewith, flail mounting means mounted on the distal end of said vertical post, flexible flail means releasably mounted in said flail mounting means whereby during threshing and upon operation of said drive means a first portion of the material leaving said material exit which is mainly straw will be spread by said flexible flail means while a second portion of the material leaving said material exit which is mainly chaff will gravitate to said chaff spreading means and be spread by said high volume air flow.

2. The combination as claimed in claim 1 further including horizontal deflector means on at least one of said first and second curved vertical walls for better material direction control.

3. The combination as claimed in claim 2 wherein said flail mounting means are tubular members with set screws to retain said flexible flail means.

4. A material spreading apparatus for use with a harvester-thresher having a material exit comprising in combination, support means on the underside of said material spreading apparatus for mounting said material spreading apparatus on said harvester-thresher, sole shroud means mounted on said support means, drive means on the underside of said material spreading apparatus and supported by said support means, a sole upper spreading means and a sole lower spreading means joined and driven as an integral unit by said drive means, said integral unit to be positioned directly in line with the material leaving said material exit, whereby said material, exiting from said harvester-thresher, has a first portion thereof spread by said sole upper spreading means and a second portion thereof spread by said sole lower spreading means.

5. A material spreading apparatus as claimed in claim 4 wherein said sole lower spreading means includes, arms having fan blades mounted thereon, said drive means vertically upwardly supporting said integral unit.

6. A material spreading apparatus as claimed in claim 5 wherein said fan blades are flexible.

7. A material spreading apparatus as claimed in claim 5 wherein said sole shroud means includes a horizontal floor fastened to said support means, a first wall extending vertically from said horizontal floor, a second wall extending vertically from said horizontal floor and forming with said first wall, two chutes to allow said material to exit therefrom when forced outwardly by a high volume air flow created by said fan blades.

8. A material spreading apparatus as claimed in claim 7 further including a material deflector on at least one of said first and second walls for a more controlled material exit.

9. A material spreading apparatus as claimed in claim 7 wherein said drive means is a variable speed hydraulic motor.

10. A material spreading apparatus as claimed in claim 4 wherein said sole lower spreading means includes arm supporting means fastened to and driven by said drive means and wherein said sole upper spreading means is connected by a connection to, and driven by, said arm supporting means.

11. A material spreading apparatus as claimed in claim 10 wherein said sole upper spreading means connection includes a vertical post having a proximal and distal end which is connected to and driven by said arm supporting mean at said vertical post proximal end.

12. A material spreading apparatus as claimed in claim 11 further including flail mounting means and wherein said vertical post distal end has mounted thereon said flail mounting means.

13. A material spreading apparatus as claimed in claim 12 further including flail means mounted in said flail mounting means in an easily removeable manner.

14. A material spreading apparatus as claimed in claim 13 wherein said flail means are flexible and are held in position by set screws in said flail mounting means.

15. A material spreading apparatus as claimed in claim 14 wherein said sole lower spreading means further includes tubular arms having fan blades, mounted on and projecting radially from said arm supporting means.

16. A material spreading apparatus as claimed in claim 15 wherein said tubular arms are slightly upwardly inclined from said arm supporting means outwardly.

17. A material spreading apparatus as claimed in claim 15 wherein said drive means is a variable speed motor and said fan blades are flexible.

18. A material spreading apparatus as claimed in claim 14 wherein said sole shroud means includes a horizontal floor and a first and second vertical wall which cooperate to form two material exit chutes.

19. In combination, a harvester-thresher body including a material exit hood, an adjustable tail chute fastened to said harvester-thresher body to assist in the guiding of material to be distributed leaving said material exit hood, adjustable flexible guide flaps attached to said material exit hood to assist the guiding of said material to be distributed leaving said material exit hood, a material spreading apparatus for evenly distributing said material leaving said material exit hood comprising support means on the underside of said material spreading apparatus mounting said material spreading apparatus on said harvester-thresher body, sole shroud means mounted on said support means, drive means on the underside of said material spreading apparatus supported by said support means, a sole lower spreading means and a sole upper spreading means joined and driven as an integral unit by said drive means, said integral unit positioned directly in line with the material leaving said material exit hood, whereby said material leaving said material exit hood has a first portion thereof spread by said sole upper spreading means and a second portion thereof spread by said sole lower spreading means.

20. The combination as claimed in claim 19 wherein said sole upper spreading means includes one or more flail mounting means, readily releasably mounting flexible flails each of which includes two free ends.

21. The combination as claimed in claim 20 wherein said integral unit is located substantially beneath said material exit hood.

22. The combination as claimed in claim 21 wherein said sole lower spreading means includes radial arms having fan blades mounted thereon, thereby creating a high volume airflow for efficient discharge of said material to be distributed.

* * * * *